Figures 1, 2:
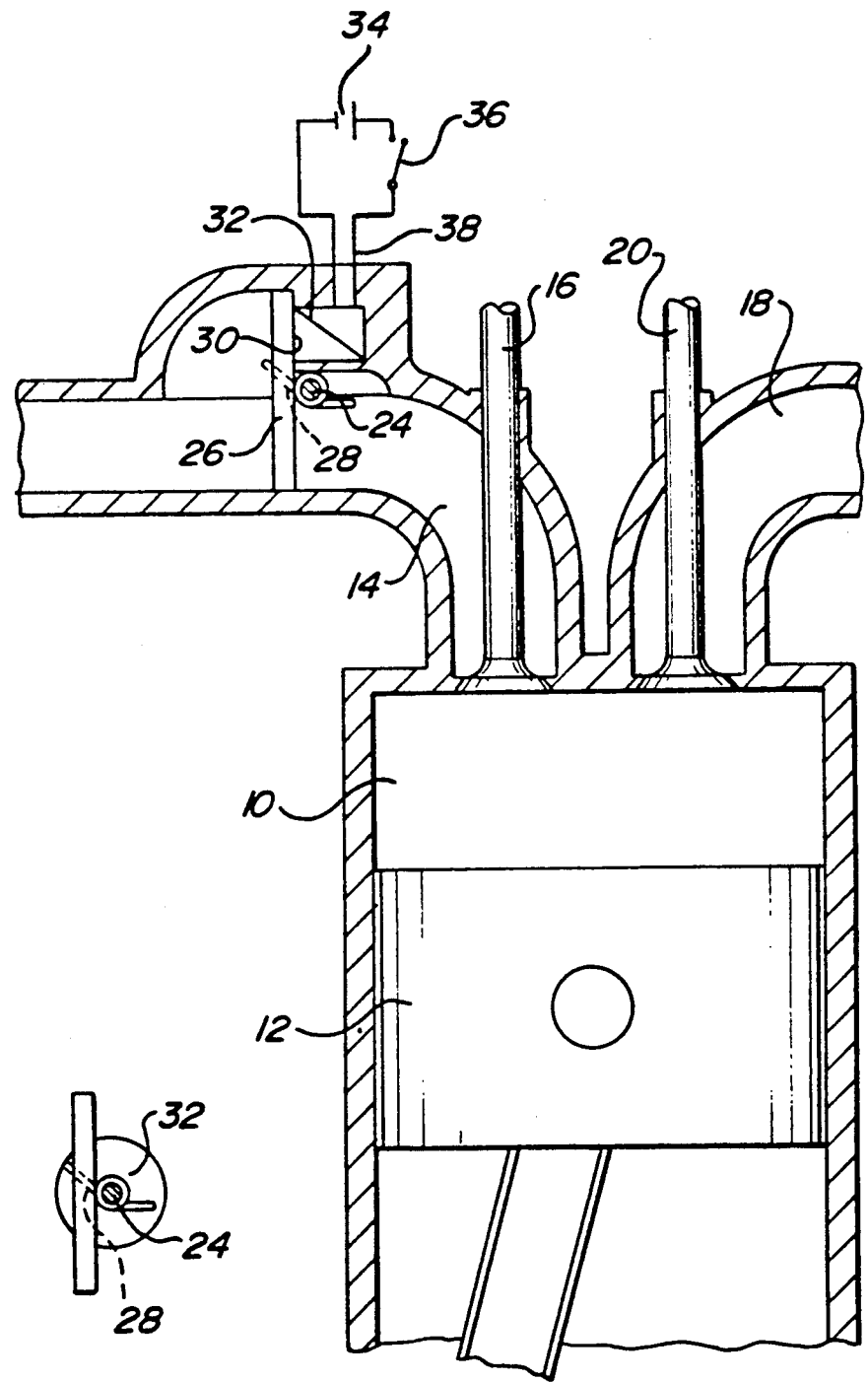

United States Patent [19]
Schatz

[11] Patent Number: 5,131,365
[45] Date of Patent: * Jul. 21, 1992

[54] PISTON TYPE IC ENGINE WITH SWING TYPE INLET VALVE

[76] Inventor: Oskar Schatz, Waldpromenade 16, D-8035 Gauting, Fed. Rep. of Germany

[*] Notice: The portion of the term of this patent subsequent to Jan. 1, 2008 has been disclaimed.

[21] Appl. No.: 603,122

[22] Filed: Oct. 25, 1990

[51] Int. Cl.⁵ .................................. F02D 9/10
[52] U.S. Cl. ........................ 123/403; 123/52 MF; 123/337
[58] Field of Search ............... 123/403, 399, 52 MF, 123/404, 337

[56] References Cited

U.S. PATENT DOCUMENTS

| | | | |
|---|---|---|---|
| 1,499,599 | 7/1924 | Seppeler et al. | 123/337 |
| 3,167,059 | 1/1965 | Love | 123/52 MF |
| 4,981,123 | 1/1991 | Schatz | 123/403 |

Primary Examiner—Andrew M. Dolinar
Attorney, Agent, or Firm—Harness, Dickey & Pierce

[57] ABSTRACT

In an IC engine of the piston type comprising at least one engine inlet valve placed between an inlet duct and each combustion chamber and a swing type check valve, which is arranged in the inlet duct upstream from the inlet valve, is adapted to shut against the direction of inlet flow and in the shut position engages an electromagnet, said check valve having an opening threshold able to be adjusted with respect to its time lag in relation to the start of inlet by the engine inlet valve, the power supply circuit of the electromagnet includes an interrupter actuated in accordance with the operating parameters of the engine.

5 Claims, 1 Drawing Sheet

PISTON TYPE IC ENGINE WITH SWING TYPE INLET VALVE

BACKGROUND OF THE INVENTION

The invention rerales to an IC engine of the piston type comprising at least one engine inlet valve located between an inlet duct and each combustion chamber and a swing type check valve which is placed in the inlet duct upstream from the engine inlet valve, is adapted to shut against the direction of inlet flow and is engaged with an electromagnet in the shut setting, such check valve having an adjustable opening threshold with a time lag with respect to the start of inlet of the engine inlet valve.

An IC engine of this type is described in the German patent publication 3,737,828 A.

The swing type check valve constitutes a particularly simple, economic and reliable way of achieving an advantageous effect, more particularly at low engine speeds. The engine inlet valve opens while the check valve is still shut. Firstly the air present in the inlet chamber between the inlet valve and the check valve first expands into the engine cylinder. If the opening of the check valve is late enough there is a vacuum in the engine cylinder. The pressure differential upstream and downstream from the check valve leads to a correspondingly high speed, after the valve has opened, of the combustion air which then flows in. Towards the end of the piston stroke this flow speed is reduced so that there is a dynamic increase in pressure even prior to the shutting of the engine inlet valve. The backward flow of charge from the engine cylinder occasioned by this boosting of pressure may then be precluded by timely shutting of the check valve.

The swing type check valve may automatically open and shut independently of additional control or automatic control devices, in which respect however there is the possibility of performing an adjustment in a simple manner in order to affect the time lag of the point in time of the opening of the check valve.

Once the opening threshold, which has previously been set, is reached, the check valve is able to open under the effect of the vacuum on the engine side. When the pressure on the engine side has increased to such an extent that the check valve is likely to be subjected to return flow of the charge out of the engine cylinder, it will automatically shut.

The said German patent publication 3,737,828 has already provided a suggestion to time the check valve opening so as to be related to angular position of the crank shaft, as for instance by a latching device released in a manner dependent on the engine crank shaft angle. On the other hHand there has also been a proposal to set the opening threshold by an adjustable vacuum or by an electromagnet replacing the vacuum.

SHORT SUMMARY OF THE PRESENT INVENTION

One object of the invention is to devise a particularly simple and effective way of controlling the swing type check valve, using on the one hand the principle of setting the opening the threshold of the check valve in accordance with the angle of the engine crank shaft, while on the other hand the particularly simple function of an electromagnet is exploited in this connection.

In order to achieve this object the power supply circuit for the electromagnet includes an interrupter which is operated in accordance with the operational parameters of the engine.

In contradistinction to the already described use of an electromagnet, whose effect for maintaining a given release force for the check valve is constantly maintained, in accordance with the invention the effect of the electromagnet is discontinued as soon as the crank has reached the set angular position, at which the opening of the check valve is to take place.

In this respect in the shut setting the check valve may engage with the electromagnet, or the electromagnet may be associated with the pivot shaft of the check as a brake magnet.

The invention will now be described in more detail with respect to the embodiments shown in the accompanying drawing.

LIST OF THE SEVERAL VIEWS OF THE DRAWING

FIG. 1 diagrammatically shows the inlet and outlet part of a cylinder of an IC engine of the piston type with a further valve designed in accordance with the invention and placed upstream from the engine inlet valve.

FIG. 2 shows a modified embodiment of the electromagnet.

DETAILED ACCOUNT OF WORKING EXAMPLE OF THE INVENTION

A piston 12 is arranged to reciprocate in the combustion chamber 10 of the engine cylinder. The combustion chamber 10 is supplied with combustion air or a combustion air-fuel mixture via the inlet duct 14, the combustion chamber 10 being able to be shut off from, and put in communication with the inlet duct 14 by an engine inlet valve 16 operated in a way dependent on the angle of the engine crank. The exhaust gas is led off via an outlet duct 18, which is connected with the combustion space via an outlet valve 20.

Upstream from the inlet valve 16 in the inlet duct 14 there is a swing type check valve 26 with a pivot shaft 24. The check valve 26 is urged or biased by a torsion spring 28 into its shut position indicated in the FIGURE, the force of the spring 28 being so selected that it pivots the check valve 26 into the indicated shut position as soon as the pressure on the side, facing the inlet valve 16, of the check valve 26 has risen almost to the pressure, which obtains upstream from the check valve 26.

In the shut setting the check valve 26 bears against an abutment face 30, in which an electromagnet 32 is placed, which is supplied from a power supply 34 via a circuit 38 including an interrupter therein. The interrupter 36 opens the circuit supplying the electromagnet 32 as soon as the associated piston 12 has reached a pre-selected setting, which corresponds to a given angle of the crank. On reaching a certain angular position of the crank the interrupter is closed again so that the electromagnet 32 is able to hold the check valve again, when the torsion spring 28 returns the check valve 26 back into its shut setting.

In the case of the modified design shown in FIG. 2 the electromagnet 32' surrounds the shaft 40, which is drivingly connected with the check valve 26, as a brake magnet in order to retain the check valve 26 in the shut position until the opening of the interrupter 36 causes the braking effect to be discontinued and the check valve 26 is released.

The interrupter may for instance be operated mechanically by a cam provided for it and whose motion is dependent on the rotation of the crank shaft, means being present for adjusting the phase relationship between the cam and the crank shaft in accordance with the operating parameters of the engine.

Since the inlet duct 14 is always shut by the check valve 26 at the desired point in time, it is possible for the timing of the end of opening of the engine inlet valve to be set for optimum conditions at high speeds, the check valve then automatically performing the function of improving torque at low speeds.

I claim:

1. An IC engine of the piston type comprising at least one engine inlet valve located between an inlet duct and each combustion chamber and a swing type check valve which is placed in the inlet duct upstream from the engine inlet valve, is adapted to shut against the direction of inlet flow and is engaged with an electromagnet in the shut setting, such check valve having an adjustable opening threshold with a time lag with respect to the start of inlet of the engine inlet valve, characterized in that the power supply circuit for the electromagnet includes an interrupter which is operated in accordance with the operational parameters of the engine.

2. The IC engine as claimed in claim 1, characterized in that the check valve is in engagement with the electromagnet in the shut position thereof.

3. The IC engine as claimed in claim 1, characterized in that the check valve has a pivot shaft which is associated with the electromagnet such that said electromagnet acts as a brake magnet to retain said check valve in a shut position and to release said check valve to an open position.

4. The IC engine as claimed in claim 1, characterized in that the interrupter is arranged to be mechanically operated by a cam whose motion is dependent on rotation of the engine crank shaft.

5. An IC engine of the piston type comprising at least one engine inlet valve located between an inlet duct and each combustion chamber and a swing type check valve which is placed in the inlet duct upstream from the engine inlet valve, is adapted to shut against the direction of inlet flow and is engaged with an electromagnet in the shut setting, such check valve having an adjustable opening threshold with a time lag with respect to the start of inlet of the engine inlet valve, characterized in that the power supply circuit for the electromagnet includes an interrupter which is arranged to be mechanically operated by a cam whose motion is dependent on rotation of the engine crank shaft and the phase relationship between the cam and the crank shaft of the engine is able to be adjusted in a manner dependent on the operational parameters of the engine.

* * * * *

UNITED STATES PATENT AND TRADEMARK OFFICE
CERTIFICATE OF CORRECTION

PATENT NO. : 5,131,365
DATED : July 21, 1992
INVENTOR(S) : Oskar Schatz

It is certified that error appears in the above-identified patent and that said Letters Patent is hereby corrected as shown below:

ON THE TITLE PAGE, add Section entitled --Foreign Application Priority Data-- and insert the following:
--Oct. 25, 1989 [DE] Fed. Rep. of Germany 8912652--.

Column 1, line 6, "rerales" should be --relates--.

Column 1, line 54, "hHand" should be --hand--.

Column 2, line 43, delete "the".

Column 2, line 44, after "FIGURE", insert --1--.

Signed and Sealed this

Ninth Day of August, 1994

Attest:

BRUCE LEHMAN

Attesting Officer     Commissioner of Patents and Trademarks